(12) United States Patent
Zheng et al.

(10) Patent No.: US 12,463,203 B2
(45) Date of Patent: Nov. 4, 2025

(54) SOLVENT-FREE ELECTROCHEMICAL CELLS WITH CONDUCTIVE PRESSURE SENSITIVE ADHESIVES ATTACHING CURRENT COLLECTORS

(71) Applicant: CCL LABEL, INC., Framingham, MA (US)

(72) Inventors: Qiang Zheng, Palo Alto, CA (US); Christine Ho, Fremont, CA (US); Jesse Smithyman, Alameda, CA (US)

(73) Assignee: CCL LABEL, INC., Framingham, MA (US)

( * ) Notice: Subject to any disclaimer, the term of this patent is extended or adjusted under 35 U.S.C. 154(b) by 1064 days.

(21) Appl. No.: 17/495,344

(22) Filed: Oct. 6, 2021

(65) Prior Publication Data

US 2022/0029155 A1 Jan. 27, 2022

Related U.S. Application Data

(63) Continuation of application No. 16/290,123, filed on Mar. 1, 2019, now Pat. No. 11,171,328.

(51) Int. Cl.
*H01M 6/40* (2006.01)
*H01M 4/36* (2006.01)
(Continued)

(52) U.S. Cl.
CPC ............ *H01M 4/366* (2013.01); *H01M 4/38* (2013.01); *H01M 4/625* (2013.01); *H01M 4/626* (2013.01);
(Continued)

(58) Field of Classification Search
None
See application file for complete search history.

(56) References Cited

U.S. PATENT DOCUMENTS 5,464,707 A 11/1995 Moulton et al.
7,727,290 B2 6/2010 Zhang
(Continued)

FOREIGN PATENT DOCUMENTS

CN 103181016 A 6/2013
CN 113574721 A 10/2021
(Continued)

OTHER PUBLICATIONS

European Application No. 20767061.3, Search Report mailed Dec. 16, 2022.
(Continued)

*Primary Examiner* — Yoshitoshi Takeuchi
(74) *Attorney, Agent, or Firm* — McDonald Hopkins LLC (57) ABSTRACT

Provided are electrochemical cells and methods of manufacturing these cells. An electrochemical cell comprises a positive electrode and an electrolyte layer, printed over the positive electrode. In some examples, each of the positive electrode, electrolyte layer, and negative electrode comprises an ionic liquid enabling ionic transfer. The negative electrode comprises a negative active material layer (e.g., comprising zinc), printed over and directly interfacing the electrolyte layer. The negative electrode also comprises a negative current collector (e.g., copper foil) and a conductive pressure sensitive adhesive layer. The conductive pressure sensitive adhesive layer is disposed between and adhered to, directly interfaces, and provides electronic conductivity between the negative active material layer and the negative current collector. In some examples, the conductive pressure sensitive adhesive layer comprises carbon and/or metal particles (e.g., nickel, copper, indium, and/or silver). Furthermore, the conductive pressure sensitive adhesive layer may comprise an acrylic polymer, encapsulating these particles.

19 Claims, 4 Drawing Sheets

(51) Int. Cl.
*H01M 4/38* (2006.01)
*H01M 4/62* (2006.01)
*H01M 4/66* (2006.01)
*H01M 10/0585* (2010.01)
*H01M 50/121* (2021.01)
*H01M 4/02* (2006.01)

(52) U.S. Cl.
CPC ....... *H01M 4/661* (2013.01); *H01M 10/0585* (2013.01); *H01M 50/121* (2021.01); *H01M 2004/027* (2013.01)

(56) References Cited

U.S. PATENT DOCUMENTS

| | | | |
|---|---|---|---|
| 9,076,589 | B2 | 7/2015 | Wright et al. |
| 9,276,292 | B1 | 3/2016 | Mackenzie et al. |
| 9,761,881 | B2 | 9/2017 | Shen et al. |
| 10,530,011 | B1* | 1/2020 | MacKenzie ....... H01M 10/0569 |
| 11,171,328 | B2 | 11/2021 | Zheng et al. |
| 2004/0234850 | A1 | 11/2004 | Watarai |
| 2010/0266895 | A1* | 10/2010 | Tucholski ........... H01M 50/186 429/185 |
| 2010/0324226 | A1 | 12/2010 | Hosotani |
| 2011/0311857 | A1* | 12/2011 | Tucholski ........... H01M 50/105 29/623.5 |
| 2012/0034500 | A1 | 2/2012 | Kaun |
| 2012/0058378 | A1 | 3/2012 | Lee |
| 2013/0000110 | A1* | 1/2013 | Takeda ............. H01M 10/0583 29/623.1 |
| 2013/0157143 | A1 | 6/2013 | Hoshiba et al. |
| 2013/0280579 | A1 | 10/2013 | Wright et al. |
| 2014/0147723 | A1 | 5/2014 | Tucholski |
| 2014/0234695 | A1 | 8/2014 | Kondo et al. |
| 2015/0037671 | A1 | 2/2015 | Iriyama et al. |
| 2015/0188108 | A1 | 7/2015 | Miyazawa et al. |
| 2015/0188195 | A1* | 7/2015 | Matsushita ....... H01M 10/0565 29/623.5 |
| 2015/0243997 | A1 | 8/2015 | Park et al. |
| 2016/0056496 | A1 | 2/2016 | Otts et al. |
| 2017/0222265 | A1 | 8/2017 | Inoue et al. |
| 2017/0279113 | A1* | 9/2017 | Ohsawa ................ H01M 50/44 |
| 2017/0288280 | A1* | 10/2017 | Shi ........................ H01M 6/181 |
| 2018/0013102 | A1 | 1/2018 | Iizuka |
| 2018/0131012 | A1* | 5/2018 | MacKenzie ....... H01M 10/0565 |
| 2018/0134923 | A1 | 5/2018 | Kurata et al. |
| 2018/0148611 | A1 | 5/2018 | Kurata et al. |
| 2018/0159166 | A1 | 6/2018 | Ansai et al. |
| 2018/0198099 | A1 | 7/2018 | Chen et al. |
| 2018/0198170 | A1 | 7/2018 | Fujita et al. |
| 2018/0258327 | A1 | 9/2018 | Tanaka et al. |
| 2018/0294454 | A1* | 10/2018 | MacKenzie ......... H01M 50/394 |
| 2018/0361705 | A1 | 12/2018 | Zeng |
| 2020/0235400 | A1 | 7/2020 | Sakai et al. |
| 2020/0235424 | A1* | 7/2020 | Mochizuki ............ H01M 4/622 |
| 2020/0280056 | A1 | 9/2020 | Zheng et al. |
| 2020/0332154 | A1 | 10/2020 | Noh et al. |
| 2020/0365871 | A1* | 11/2020 | Smithyman ......... H01M 10/425 |
| 2021/0143482 | A1* | 5/2021 | Oura .................. H01M 10/0585 |
| 2022/0037649 | A1* | 2/2022 | Chakravarthy ....... H01M 4/131 |

FOREIGN PATENT DOCUMENTS

| | | |
|---|---|---|
| EP | 1749319 B1 | 7/2014 |
| EP | 2577781 B1 | 8/2017 |
| EP | 3912202 | 11/2021 |
| GB | 2554860 A | 4/2018 |
| JP | H07307145 A | 11/1995 |
| JP | 2010153244 A | 7/2010 |
| JP | 2018063850 A | 4/2018 |
| WO | 2019074076 A1 | 4/2019 |
| WO | 2020180568 A1 | 9/2020 |

OTHER PUBLICATIONS

U.S. Appl. No. 16/290,123, Requirement for Restriction/Election, Nov. 24, 2020, 8 pgs.
U.S. Appl. No. 16/290,123, Examiner Interview Summary mailed Feb. 5, 2021, 1 pg.
U.S. Appl. No. 16/290,123, Examiner Interview Summary mailed Mar. 17, 2021, 2 pgs.
U.S. Appl. No. 16/290,123, Examiner Interview Summary mailed Sep. 9, 2021, 1 pg.
U.S. Appl. No. 16/290,123, Non-Final Office Action mailed Feb. 5, 2021, 18 pgs.
U.S. Appl. No. 16/290,123, Notice of Allowance mailed Sep. 9, 2021, 15 pgs.
International Application Serial No. PCT/US20/19951, Preliminary Report on Patentability mailed Sep. 16, 2021, 6 pgs.
International Application Serial No. PCT/US20/19951, Search Report and Written Opinion mailed May 28, 2020, 7 pgs.
Office Action in CN2020800180347, mailed Mar. 7, 2024, 20 pages.

* cited by examiner

SOLVENT-FREE ELECTROCHEMICAL CELLS WITH CONDUCTIVE PRESSURE SENSITIVE ADHESIVES ATTACHING CURRENT COLLECTORS

CROSS-REFERENCE TO RELATED APPLICATIONS

This application is a continuation of U.S. patent application Ser. No. 16/290,123, filed on 2019 Mar. 1, which is incorporated herein by reference in its entirety for all purposes.

BACKGROUND

The reduction in size and performance improvements of electronic devices and batteries have opened doors to new applications, such as low power sensors, wireless transmission, printed electronics, and the like. While thin film, lithium polymer, and semi-printed batteries have been considered in the past, each one of these battery types has significant shortcomings, limiting its adoption. For example, vapor-deposited thin film batteries have low storage capacities and power capabilities due to the limitations of the deposition process. Lithium polymer batteries are sensitive to operating and environmental conditions and require special monitoring circuits. Semi-printed batteries typically use liquid electrolytes, creating sealing issues and potentially causing leaks. Furthermore, integrating multiple layers in semi-printed batteries has been challenging.

What is needed is a safe and robust solvent-free battery for a wide variety of applications.

SUMMARY

Provided are electrochemical cells and methods of manufacturing these cells. An electrochemical cell comprises a positive electrode, an electrolyte layer, printed over the positive electrode. In some examples, each of the positive electrode, electrolyte layer, and negative electrode comprises an ionic liquid enabling ionic transfer. The negative electrode comprises a negative active material layer (e.g., comprising zinc), printed over and directly interfacing the electrolyte layer. The negative electrode also comprises a negative current collector (e.g., copper foil) and a conductive pressure sensitive adhesive layer. The conductive pressure sensitive adhesive layer is disposed between and adhered to, directly interfaces, and provides electronic conductivity between the negative active material layer and the negative current collector. In some examples, the conductive pressure sensitive adhesive layer comprises carbon and/or metal particles (e.g., nickel, copper, indium, and/or silver). Furthermore, the conductive pressure sensitive adhesive layer may comprise an acrylic polymer, encapsulating these particles.

Illustrative, non-exclusive examples of various inventive features according to the present disclosure are described in the following enumerated paragraphs:

A1. Electrochemical cell 100 comprising: positive electrode 120; electrolyte layer 150, printed over and directly interfacing positive electrode 120; and negative electrode 180, comprising negative active material layer 150, negative current collector 185, and conductive pressure sensitive adhesive layer 170, wherein:
negative active material layer 160 is printed over and directly interfaces electrolyte layer 150,
conductive pressure sensitive adhesive layer 170 directly interfaces, adheres to each of negative active material layer 160 and negative current collector 185, supports negative active material layer 160 and negative current collector 185 relative to each other and provides electronic conductivity between negative active material layer 160 and negative current collector 185, and
conductive pressure sensitive adhesive layer 170 comprises polymer base 172 and conductive filler 174.

A2. Electrochemical cell 100 of paragraph A1, wherein conductive pressure sensitive adhesive layer 170 has a thickness of less than 100 micrometers.

A3. Electrochemical cell 100 of any one of paragraphs A1-A2, wherein conductive filler 174 in conductive pressure sensitive adhesive layer 170 has a concentration of less than about 50% by volume.

A4. Electrochemical cell 100 of any one of paragraphs A1-A3, wherein polymer base 172 is an acrylic polymer or a polyisobutylene (PIB).

A5. Electrochemical cell 100 of any one of paragraphs A1-A4, wherein conductive filler 174 comprises carbon particles.

A6. Electrochemical cell 100 of any one of paragraphs A1-A5, wherein conductive filler 174 further comprises metal particles.

A7. Electrochemical cell 100 of any one of paragraphs A1-A6, wherein the metal particles of conductive filler 174 comprise one or more of nickel particles, copper particles, bismuth particles, indium particles, and silver particles.

A8. Electrochemical cell 100 of any one of paragraphs A1-A7, wherein conductive filler 174 comprises both carbon particles and metal particles.

A9. Electrochemical cell 100 of any one of paragraphs A1-A8, wherein particles of conductive filler 174 are encapsulated by polymer base 172 within conductive pressure sensitive adhesive layer 170.

A10. Electrochemical cell 100 of any one of paragraphs A1-A9, wherein particles of conductive filler 174 have a mean particle size of between about 1 micrometer and 35 micrometers.

A11. Electrochemical cell 100 of any one of paragraphs A1-A10, wherein negative active material layer 160 comprises zinc.

A12. Electrochemical cell 100 of any one of paragraphs A1-A11, wherein negative current collector 185 comprises copper.

A13. Electrochemical cell 100 of any one of paragraphs A1-A12, further comprising first packaging layer 110 and second packaging layer 190, collectively enclosing, sealing, and isolating positive electrode 120, electrolyte layer 150, and negative electrode 180 from the environment, wherein at least one of first packaging layer 110 and second packaging layer 190 is flexible and conformal to positive electrode 120, electrolyte layer 150, and negative electrode 180.

A14. Electrochemical cell 100 of any one of paragraphs A1-A13, wherein second packaging layer 190 is flexible and adhered to negative current collector 185.

A15. Electrochemical cell 100 of any one of paragraphs A1-A14, wherein at east one of first packaging layer 110 and second packaging layer 190 is polyester.

A16. Electrochemical cell 100 of any one of paragraphs A1-A15, wherein each of positive electrode 120, electrolyte layer 150, and negative electrode 180 comprises an ionic liquid.

A17. Electrochemical cell 100 of any one of paragraphs A1-A16, wherein electrochemical cell 100 is substantially free from organic solvents.

B1. Method 500 of fabricating electrochemical cell 100, method 500 comprising:
  printing a positive active material layer 140 over a positive current collector 125;
  printing an electrolyte layer 150 over positive active material layer 140;
  printing a negative active material layer 160 over electrolyte layer 150; and
  laminating a negative current collector assembly 187 over negative active material layer 160, wherein:
    negative current collector assembly 187 comprises a negative current collector 185 and a conductive pressure sensitive adhesive layer 170,
    after laminating, conductive pressure sensitive adhesive layer 170 directly interfaces and adheres to each of negative active material layer 160 and negative current collector 185, and
    the conductive pressure sensitive adhesive layer 170 comprises a polymer base 172 and a conductive filler 174.

B2. Method 500 of paragraph B1, wherein laminating negative current collector assembly 187 over negative active material layer 160 is performed at a temperature of less than 80° C.

B3. Method 500 of any one of paragraphs B1-B2, wherein laminating negative current collector assembly 187 over negative active material layer 160 forms an electrical connection between negative current collector 185 and negative active material layer 160.

These and other examples are described further below with reference to the figures.

DETAILED DESCRIPTION

In the following description, numerous specific details are set forth in order to provide a thorough understanding of the presented concepts. The presented concepts may be practiced without some or all of these specific details. In other instances, well-known process operations have not been described in detail so as to not unnecessarily obscure the described concepts. While some concepts will be described in conjunction with the specific examples, it will be understood that these examples are not intended to be limiting. On the contrary, it is intended to cover alternatives, modifications, and equivalents as may be included within the spirit and scope of the present disclosure as defined by the appended claims.

Various examples are described herein in the context of printable electrochemical cells with multivalent metal ions (e.g., $Zn^{2+}$) used for carrying the charge between the positive and negative electrodes in the cells. "Multivalent" is herein defined as an atomic or molecular species carrying more than one full charge. However, one having ordinary skill in the art will appreciate that some features are applicable to other types of electrochemical cells and/or other methods of manufacturing electrochemical cells. For example, conductive pressure sensitive adhesive layers may be used in electrochemical cells with monovalent metal ions.

In this disclosure, the term "anode" refers to a negative electrode, which includes negative active material (e.g., Zn). The term "cathode" refers to a positive electrode, which includes positive active material (e.g., vanadium pentoxide ($V_2O_5$), manganese dioxide ($MnO_2$) particles, cobalt oxide ($CoO_x$) particles, lead oxide ($PbO_x$) particles, or the like). In other words, "anode" and "negative electrode" are used interchangeably regarding the operation state (e.g., charge or discharge) of the electrochemical cell. Likewise, "cathode" and "positive electrode." are used interchangeably regarding the operation state (e.g., charge or discharge) of the electrochemical cell.

"Ionic liquids" or, more specifically, "room temperature ionic liquids," are defined as a class of liquids that are organic salts and have a melting point of less than 100° C. Ionic liquids provide high ionic conductivity and have a low vapor pressure. Furthermore, ionic liquids are electrochemically and thermally stable. Combining ionic liquids with certain polymers is used to form electrolytes. Ion transport characteristics of these ionic liquid-based electrolytes are similar to conventional liquid electrolytes, which use solvents or, more specifically, organic solvents, to provide ion transport characteristics. At the same time, ionic liquid-based electrolytes are structurally robust and able to maintain physical separation between positive and negative electrodes under compression and bending conditions. Finally, in a typical ambient environment and at a room temperature, ionic liquid-based electrolytes do not dry out or "sweat" since the ionic liquids are negligibly volatile.

Introduction

Using printing techniques to form various battery components, such as positive active materials layers, electrolyte layers, and negative active material layers, provides unique opportunities for battery design and yields specific performance characteristics. For example, printing an active material layer on a current collector establishes a robust electromechanical connection between this active material layer and the current collector. Printing involves depositing a layer of ink onto a base, which may be a substrate or another printed layer. For purposes of this disclosure, the terms "ink" and "slurry" are used interchangeably. Depending on the type of a printed layer, the ink may contain a binder, one or more active material particles and, in some examples, conductive additive particle. Specifically, when an active material layer is printed on a current collector, the ink establishes very conformal contact with the surface of the current collector. This conformality provides strong adhesion between the binder and the surface when the ink is dried. Furthermore, active material particles and/or conductive additives in the ink are able to get closer to the surface of the current collector and better electrical connection in comparison, for example, to lamination of a preformed active material layer onto the current collector.

At the same time, a stack forming an electrochemical cell comprises two current collectors with a positive active material layer, an electrolyte layer, and a negative active material layer disposed between these current collectors as further described below with reference to FIG. 2A. As such, the stack has four interfaces: (1) between the positive current collector and the positive active material layer, (2) between the positive active material layer and the electrolyte layer, (3) between the electrolyte layer and the negative active material layer, and (4) between the negative active material layer and the negative current collector. Up to three of these interfaces may be formed by printing. For example, the positive active material layer may be printed over the positive current collector, followed by the electrolyte layer printed over the positive active material layer, and finally, the negative active material layer printed over the electrolyte layer. In other examples, the negative active material layer may be printed over the negative current collector, followed by the electrolyte layer printed over the negative active material layer, and finally, the positive active material layer printed over the electrolyte layer. However, at least one of these interfaces cannot be formed by printing, unless a current collector is printed over an active material layer. It has been established that printed current collectors generally have poor conductivity and mechanical strength and present difficulties when forming external connections in comparison to pre-formed metal current collectors, such as metal foils. Furthermore, any processing that involves a stack of pre-printed cell components generally has a temperature limit, e.g., less than 80° C. in some examples. This temperature limit may depend on various components (e.g., polymers in the pre-printed layers) as well as materials of the packaging layers, which may be used for support and environmental protection of internal components. This temperature limit may prevent conventional printed conductors, such as conductive inks based on nickel, copper, and silver particles, from being used in the laminated stack. Some examples of these inks require high temperature curing, above 80° C., 150° C., and sometimes 300° C.

It has been found that forming a non-printed interface between one of the active material layers and a corresponding current collector causes less negative impact than, for example, a non-printed interface between one of the active material layers and the electrolyte layer. In particular, an interface between the negative active material layer and the negative current collector may be formed by a technique other than printing. However, forming an electro-mechanical connection of a non-printing interface between two solid layers, such as between a previously printed (pre-printed) active material layer and a current collector, can be challenging. Surfaces forming this interface already have established shapes and topographies and may not easily conform to each other.

Proposed methods and electrochemical cells utilize a conductive pressure sensitive adhesive, placed between a pre-printed active material layer and a current collector. A specially designed and configured conductive pressure sensitive adhesive can provide an excellent electro-mechanical connection between these components in some types of electrochemical cells. More specifically, a conductive pressure sensitive adhesive is suitable for solvent-free electrochemical cells, in which solvents are not available for interacting with the conductive pressure sensitive adhesive and weakening the bonds provided by the adhesive, e.g., completely dissolving the adhesive in some examples. Loss of electro-mechanical connections, due to solvent interactions with the adhesive, increases the impedance of the cell, making the cell potentially inoperable. It should be noted that most conventional cells use solvents in electrolytes to assist with ionic transport. Once introduce into the cell, the solvent can migrate inside the cell and contact other internal components, include various layers between current collectors. As such, pressure sensitive adhesives (PSAs) are generally not suitable and are not used as internal components in conventional electrochemical cells.

In electrochemical cells that are solvent-free, the integrity of the conductive pressure sensitive adhesive is preserved. In particular, the integrity of the polymer base of the adhesive is preserved, which would otherwise be impacted by solvents. Without solvents being present in the cell, the conductive pressure sensitive adhesive maintains the electro-mechanical connection between the active material layer and the current collector during the operating lifetime of the cell. For purposes of this disclosure, a solvent-free electrochemical cell is defined as an electrochemical cell having an overall concentration of organic solvents (such as carbonates and esters, phosphates and others) less than 2% by weight of all internal components or even less than 0.5% by weight.

Another aspect of solvent-free cells is the ability to use new materials (e.g., for conductive pressure sensitive adhesives and other components) that would otherwise be electrochemically unstable in a solvent-containing environment. Specifically, in solvent-free cells, various components, positioned away from an electrolyte layer, are ionically/electrochemically decoupled from the electrolyte layer. Referring to a specific example, a zinc-based electrochemical cell has an over-polarization on the negative electrode of about 0.77 Volts vs. $H/H^+$. When a solvent is present is this cell, any material contacting the solvent needs to have over-potential of at least 0.77 Volts vs. $H/H^+$ to reduce water decomposition and gas evolution. However, in a solvent-free environment, components, which are positioned away from the electrolyte, are ionically decoupled. As such, even materials with an over-potential of less than 0.77 Volts vs. $H/H^+$ can be used for these components. For example and as further described below, a conductive pressure sensitive adhesive used for bonding the negative active material layer to the negative current collector in a zinc-based solvent-free electrochemical cell may comprise nickel, silver, iron, aluminum, and copper. These materials are generally not usable for negative electrodes and components contacting negative electrodes in conventional zinc-based electrochemical cells, which comprise solvents.

A conductive pressure sensitive adhesive may be in a form of a thin layer, e.g., less than 100 micrometers thick or even less than 50 micrometers or less than 20 micrometers thick, on average. Even with such low thicknesses, the conductive pressure sensitive adhesive can provide sufficient mechanical support and conformal contact to pre-printed active material layers and current collectors. Furthermore, the resistance of a layer is inversely proportional to the layer's thickness. A low thickness of the conductive pressure sensitive adhesive layer allows using a material with a relatively high resistivity for this layer, especially for low-current power applications, such as sensors. In some examples, the resistivity of a conductive pressure sensitive adhesive is at least 0.5 $Ohm/cm^2$ or even at least about 2 $Ohm/cm^2$ or, with references to the volumetric resistivity, at least about 0.1 Ohm*cm. Allowing for higher resistivity translates into a lower volumetric concentration of conductive fillers needed in the conductive pressure sensitive adhesive. In some examples, the volumetric concentration of one or more conductive fillers in a conductive pressure sensitive adhesive layer is less than 30% or even less than 10%. At such low concentrations, the conductive filler is encapsulated by a polymer base of the conductive pressure sensitive adhesive, providing further electrochemical isolation.

Unlike conductive inks and other types of conductive adhesives, a conductive pressure sensitive adhesive does not require heating when laminated between the active material layer and the current collector. In some examples, the temperature used for laminating is less than 80° C. Furthermore, there is no need for solvent evaporation, cross-linking, and completing various steps needed when other types of conductive adhesives are used.

Electrochemical Cell Examples

Figure 1:
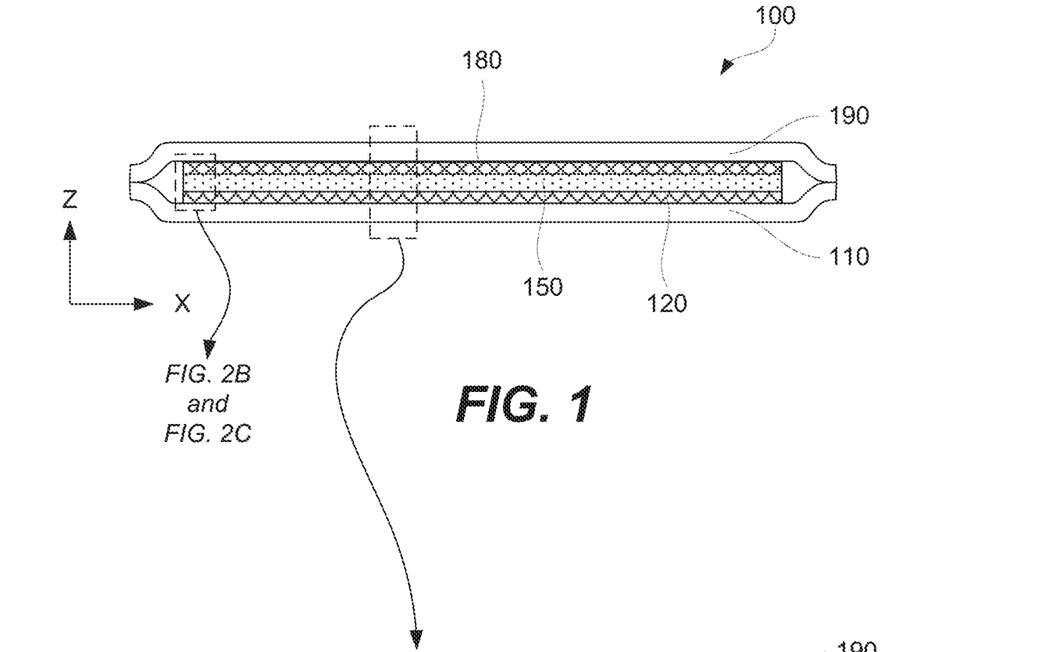
FIG. 1 is a schematic cross-sectional view of an electrochemical cell, illustrating major components of the cell, in accordance with some examples.

FIG. 1 is a schematic illustration of electrochemical cell 100, in accordance with some examples. Electrochemical cell 100 comprises positive electrode 120, negative electrode 180, and electrolyte layer 150, which may be collectively referred to as an internal component. Electrolyte layer 150 is disposed, and provides ionic communication between, positive electrode 120 and negative electrode 180. In some examples, electrochemical cell 100 multiple positive electrodes and/or multiple negative electrodes, e.g., forming a stack of alternating positive and negative electrodes. Additional features of positive electrode 120 and negative electrode 180 are described below with reference to FIG. 2A.

Electrochemical cell 100 also comprises first packaging layer 110 and second packaging layer 190, which enclose and protect the internal component of electrochemical cell 100 from the environment. For example, first packaging layer 110 and second packaging layer 190 may be sealed around the perimeter. Various examples of packaging layers are described below.

In some examples, first packaging layer 110 and/or second packaging layer 190 are shared with other devices, such as another electrochemical cell, sensor, antenna, charging circuitry, and the like. When multiple electrochemical cells share the same substrate, these cells may be interconnected in series, parallel, or a combination of two methods. In some examples, multiple electrochemical cells may be stacked along the Z-axis, such that second packaging layer 190 is shared by two electrochemical cells, as a top packaging layer in one cell and as a bottom packaging layer in another cell.

Positive Electrode Examples

Figure 2A:
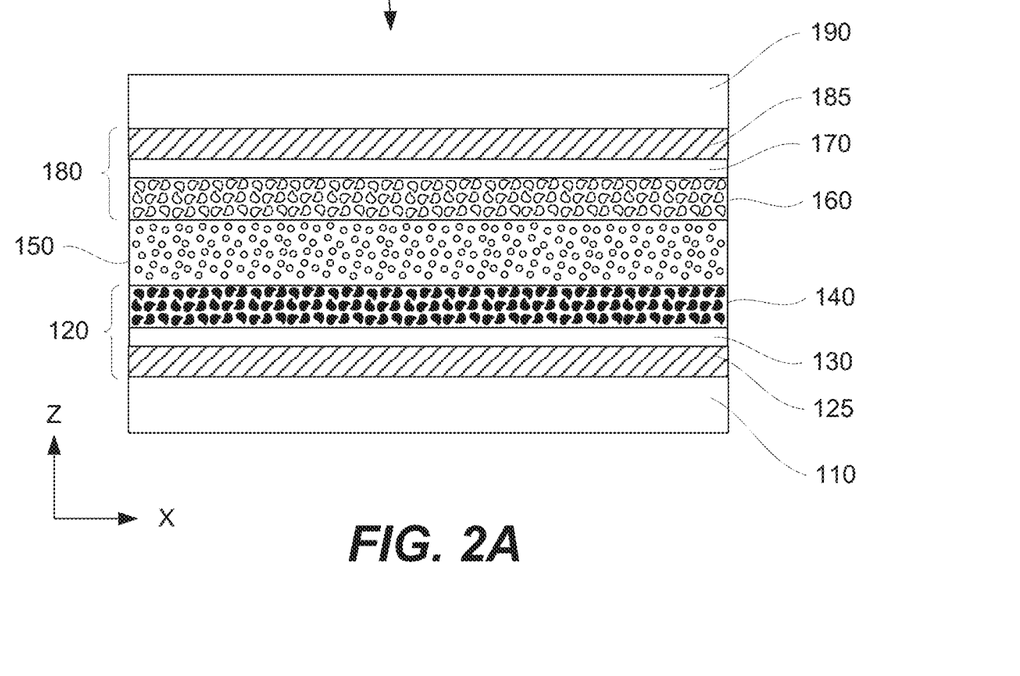
FIG. 2A is an expanded cross-sectional view of a portion of the electrochemical cell in FIG. 1, illustrating additional features of negative and positive electrodes, in accordance with some examples.

Referring to FIG. 2A, positive electrode 120 comprises positive current collector 125 and positive active material layer 140. In some examples, positive active material layer 140 is printed over positive current collector 125. Alternatively, positive active material layer 140 is laminated to positive current collector 125 using a conductive pressure sensitive adhesive layer. While the following description focuses on a conductive pressure sensitive adhesive layer being a part of negative electrode 180, one having ordinary skills in the art would understand that a conductive pressure sensitive adhesive layer may be also used in positive electrode 120.

Figure 4:
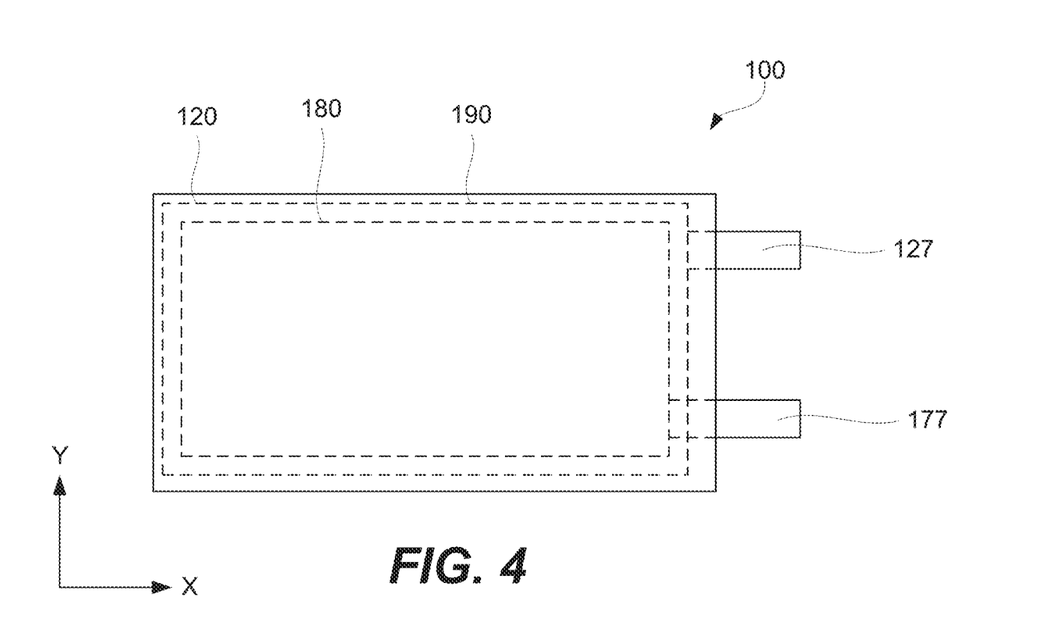
FIG. 4 is a schematic top view of an electrochemical cell, in accordance with some examples.

Positive current collector 125 provides electronic conductivity between positive active material layer 140 and positive terminal 127, which is schematically shown in FIG. 4. In some examples, a portion of positive current collector 125, which is free from positive active material layer 140 and which extends outside of the boundary of first packaging layer 110 and second packaging layer 190, is operable as positive terminal 127.

In some examples, positive current collector 125 is a metal foil having a thickness of between 1 micrometer and 80 micrometers or, more specifically, between 5 micrometer and 30 micrometers. Other examples of positive current collector 125 include graphite foil, foil made from carbon nanotubes (with or without a binder), metal-plated fibers, metal foams (e.g., nickel foam or copper foam), screens and extended metal structures, grids, woven metal mesh, and the like. In the same or other examples, positive current collector 125 is formed from, or at least comprises, one or more of nickel, stainless steel, regular steel, titanium, and aluminum. In other examples, positive current collector 125 is a printed layer, comprising a polymer binder and a conductive additive. Some examples of conductive additive include, but are not limited to, graphite, carbon black, graphene, and carbon nanotubes. This example of positive current collector 125 may be formed using one or more of inkjet printing, screen printing, stencil printing, flexographic printing, and/or slot die coating.

Figure 2B:
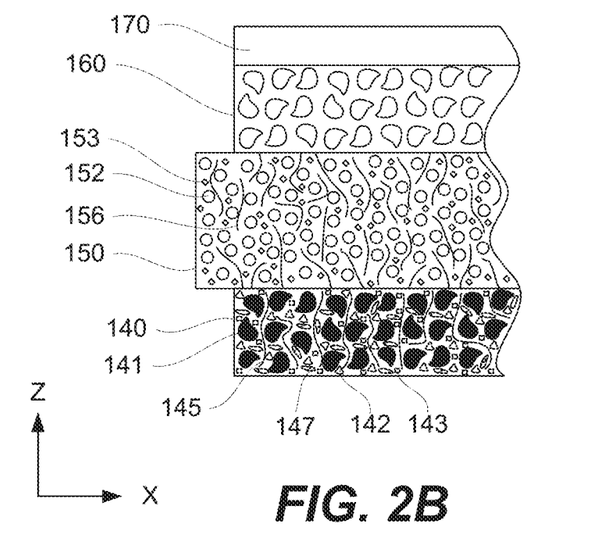
FIGS. 2B and 2C are expanded cross-sectional views of two edge examples in a stack formed by internal components of the electrochemical cell in FIG. 1.

In some examples, positive active material layer 140 comprises positive active material 141 and positive layer binder 145 as schematically shown in FIG. 2B. In some examples, positive active material 141 comprises or consists essentially of a metal oxide or, more specifically, transition metal oxide (e.g., containing a metal from the 4th row of the Periodic Table of the Elements). Some examples of positive active material 141 include, but are not limited to, manganese oxide ($MnO_2$), nickel oxide ($NiO_2$), vanadium oxide ($V_2O_5$), ferric phosphate ($FePO_4$), cobalt oxide ($CoO_2$), lead oxide (PbO), and chromium oxide ($Cr_2O_3$). Positive active material 141 may be in the form of particles, having a mean particles size of between about 1 micrometer and 100 micrometers. In some examples, positive active material layer 140 comprises a combination of carbon and oxygen combination, e.g., when electrochemical cell 100 is a zinc-air battery.

In some examples, positive layer binder 145 is one of polyvinylidene difluoride (PVDF), acrylate, or cellulose derivative. In some examples, the concentration of a binder is between 1% and 20% by weight, or more specifically between 2% and 5%. The selection of positive layer binder 145 is controlled, in part, by the ink deposition process, e.g., screen-printing.

In some examples, positive active material layer 140 further comprises conductive additive 147, as schematically shown in FIG. 2B. Some examples of conductive additive 147 include, but are not limited to, conductive carbons (e.g., carbon black, graphite, carbon nanotubes, graphene), or conductive nanoparticles (e.g., metal nanoparticles). The amount of conductive additive 147 may be between 0.01% and 30% by weight or, more specifically, between 2% and 5% for carbon black and graphite and/or between 0.01% and 2% for carbon nanotubes and graphene.

In some examples, positive active material layer 140 further comprises positive active layer ionic liquid 142, as schematically shown in FIG. 2B. When present, positive active layer ionic liquid 142 may be the same as or different from electrolyte ionic liquid 152, schematically shown in FIG. 2B and various examples of which are described below. In some examples, positive active layer ionic liquid 142 is 1-ethyl-3-methyl imidazolium bis(trifluoromethylsulfonyl) imide (EMM TFSI), represented by the formula $C_8H_{11}F_6N_3O_4S_2$. In other examples, positive active layer ionic liquid 142 is 1-ethyl-3-propyl pyrrolidinium bis(trifluoromethylsulfonyl) imide. Positive active material layer 140 may be printed with positive active layer ionic liquid 142 already present in the printing ink. In these examples, electrolyte ionic liquid 152 does not need to migrate into positive active material layer 140. As such, positive active layer ionic liquids 142 may have uniform distribution (e.g., uniform concentration) throughout the thickness of positive active material layer 140. In general, a wide range of ionic liquids is applicable for Zn—MNo$_2$ type of electrochemical cell 100, such as ionic liquids electrochemically stable from about −0.8V to 1.3V versus hydrogen standard potential. Specific examples include, but are not limited to, imidazolium, pyrrolidinium, piperidinium, tetraalkyl ammonium ionic liquids with variety of anions: bis(trifluoromethane) sulfonimide (TFSO), trifluormethylsulfonyl (TFS), bis(fluorosulfonyl)imide (FSI), tetrafluoroborate (BF$_4^-$), bis(oxalato)borate (BOB), and the like.

In some examples, positive active material layer 140 further comprises positive layer salt 143, as schematically shown in FIG. 2B. Positive layer salt 143 may be a zinc-containing salt, such as zinc(II) bis (trifluoromethanesulfonyl)imide (Zn-TFSI) represented by the following formula Zn(C$_2$F$_6$NO$_4$S$_2$)$_2$. Positive layer salt 143 may be introduced into positive active material layer 140 during printing of positive active material layer 140 on positive current collector 125. Other examples of positive layer salt 143 are Zn-containing and not Zn-containing salts, such as zinc chloride (ZnCl2), zinc fluoroborate (Zn(BF$_4$)$_2$), ammonium chloride (NH$_4$Cl), Ammonium tetrafluoroborate (NH$_4$BF$_4$), potassium hydroxide (KOH), and the like. In general, salts that are not moisture sensitive and do not react with moisture and oxygen may be used since such salts allow printing and drying positive active material layer 140 and subsequent layers in the ambient environment.

Also shown in FIG. 2A is positive interface layer 130, which is optional. When present, positive interface layer 130 is disposed between positive current collector 125 and positive active material layer 140. Positive interface layer 130 is used for adhesion, interface conductivity, and soaking up electrolyte components (e.g., operable as a reservoir). In some examples, positive interface layer 130 serves as a primer or adhesion-promoter between the binder of positive active material layer 140 and positive current collector 125. Enhanced helps with providing and maintaining the energy density of electrochemical cell 100. In some examples, positive active material layer 140 comprises less than 5% by weight of polymer binder allowing for more active materials in the layer. Such low amounts of the polymer binder are typically not sufficient for adhesion to positive current collector 125 when positive interface layer 130 is not used. Adding positive interface layer 130 allows decreasing the amount of polymer binder in positive active material layer 140 and increasing the amount of the active materials. Positive interface layer 130 may be a thin layer, which does not occupy a lot of space inside electrochemical cell 100. Unlike positive active material layer 140, positive interface layer 130 comprises much higher amounts of polymer binders, such as at least about 5% by weight (e.g., between about 5% and 30%) or at least about 10% by weight or even at least about 20%. Furthermore, in some examples, positive active material layer 149 may swell during its discharge and dry up as a result. Positive interface layer 130 may be operable as a reservoir for ionic conductors, i.e. salt and ionic liquid described above. In some examples, positive interface layer 130 is a carbon layer. Positive interface layer 130 may be printed over positive current collector 125 using ink comprising, e.g., carbon black, PVDF, and n-methyl-2-pyrrolidone (NMP). The thickness of positive interface layer 130 may be between 0.5 micrometers and 5 micrometers or, more specifically, between 1 micrometer and 2 micrometers.

Electrolyte Layer Examples

Referring to FIGS. 1 and 2A-2C, electrolyte layer 150 provides ionic communication between negative electrode 180 and positive electrode 120 or, more specifically, between negative active material layer 160 and positive active material layer 140. For example, electrolyte layer 150 facilitates transmission of multivalent ions, such as zinc, aluminum, magnesium and/or yttrium ions, between negative active material layer 160 and positive active material layer 140. Other types of ions are also within the scope.

Referring to FIG. 2B, in some examples, electrolyte layer 150 comprises electrolyte binder 156, electrolyte ionic liquid 152, and electrolyte salt 153. Electrolyte binder 156 mechanically supports other components in electrolyte layer 150 relative to each other. Furthermore, electrolyte binder 156 supports electrolyte layer 150 relative to other components, e.g., when electrolyte layer 150 is printed over negative active material layer 160 or over positive active material layer 140. Some examples of electrolyte binder 156 include, but are not limited to, polymers and copolymers of trifluoroethylene, tetrafluoroethylene, vinylidene chloride, vinylidene difluoride (difluoroethylene), hexafluoropropylene, styrene, butadiene, ethylene oxides, acrylate and/or methacrylate esters, variations, and rubbers thereof, and so forth, as well as polyesters, polyanilines, polyethers, polyimides, copolymers and blends thereof, so forth. The polymer may be linear, branched, or cross-linked. More specific examples include poly(vinylidene fluoride) (PVDF), poly (vinylidene fluoride-hexaflouropropylene) (PVDF-HFP), polyvinyl alcohol (PVA), poly(ethylene oxide) (PEO), poly (acrylo-nitrile) (PAN), and poly(methyl methacrylate) (PMMA), epoxy derivatives, and silicone derivatives.

Electrolyte ionic liquid 152 enhances ionic conductivity of electrolyte layer 150. In some examples, the ionic conductivity of electrolyte layer 150 is between 2.3 mS/cm and 2.7 mS/cm. Electrolyte ionic liquid 152 comprises anions and cations, which, in some examples, are organic cations or inorganic cations. Some examples of these organic cations are imidazolium, pyrrolidinium, ammonium, pyridinium, piperidinium, phosphonium, sulfonium, and tetraalkyl ammonium. Some examples of inorganic cations include, but are not limited to, Li, Zn, Na, Al, Mn, Mg, and Y (yttrium) ions. Examples of anions include, but are not limited to, organosulfonate (e.g., methanesulfonate [mesylate], trifluoromethanesulfonate [triflate], toluenesulfonate [tosylate], so forth), organosulfimide (e.g., bis((methyl) sulfonyl)imide [mesylate sulfimide, or MSI]), bis(trifluoromethylsulfonyl)-imide [TFSI]), sulfate, phosphate, organophosphate, organoborate (e.g., trialkyl borate, chelated organoborate, bis(oxalo)borate, so forth), tetrachloroborate, acuminate, dicyanamide, carboxylate (e.g., formate, acetate), perchlorate, nitrate and halide (e.g., chloride, bromide, iodide). Additional anions examples include 1-butyl-3-methylimidazolium perchlorate, 1-butyl-3-methylimidazolium hydroxide, 1-butyl-3-methylimidazolium trifluoromethanesulfonate, 1-butyl-3-methylimidazolium methanesulfonate, 1-butyl-2,3-dimethylimidazolium methanesulfonate, 1-butyl-2,3-dimethylimidazolium trifluoromethanesulfonate, 1-butyl-1-methylpyrrolidinium methanesulfonate, 1-butyl-1-methylpyridinium methanesulfonate, 1-butyl-1-methylpyridinium trifluoromethanesulfonate, 1-ethyl-1-methyl-pyrrolidinium methanesulfonate, 1-ethyl-1-methylpyrrolidinium trifluoromethanesulfonate, 1-methyl-1-propyl-pyrrolidinium methanesulfonate, 1-ethyl-1-methylpyrrolidinium trifluoromethanesulfonate, 1-ethyl-3-methylimidazolium (EMIM) methanesulfonate, 1-ethyl-3-methyl-imidazolium (EMIM) hydroxide, 1-ethyl-3-methylimidazolium (EMIM) trifluoromethanesulfonate, 1-butyl-3-methylimidazolium (BMIM) formate, 1-butyl-2,3-dimethylimidazolium formate, 1-butyl-1-methylpyrrolidinium formate, 1-butyl-3-methylimidazolium acetate, 1-butyl-1-methylpyrrolidinium acetate, 1-butyl-1-methylpyrrolidinium trifluoromethanesulfonate, 1-butyl-1-methylpyrrolidinium tetrachloroborate, 1-butyl-1-methylpyridinium tetrachloroborate, 1-ethyl-1-methylpyrrolidinium tetrachloroborate, 1-ethyl-3-methylimidazolium tetrachloroborate, 1-ethyl-1-methylpyrrolidinium trifluoromethanesulfonate, 1-methyl-1-propylpyrrolidinium tetrachloroborate, 1-methyl-1-propylpyrrolidinium trifluoromethanesulfonate, 1-butyl-3-methylimidazolium propionate, 1-butyl-1-methylpyrrolidinium propionate, 1-butyl-3-methylimidazolium tetraphenylborate, 1-butyl-3-methylimidazolium bis(fluorosulfonyl)imide, 1-butyl-3-methylimid-azolium bis(trifluoromethane)sulfonimide, 1-butyl-2,3-dimethyl-imidazolium tetraphenylborate, 1-butyl-2,3-dimethyllimidazolium bis(fluorosulfonyl)imide, 1-butyl-2,3-dimethylimidazolium bis(trifluoromethane)sulfonimide, 1-butyl-3-methylimidazolium bis(methylsulfonyl)imide, 1-butyl-2,3-dimethyllimidazolium bis((methyl)sulfonyl)imide, 1-butyl-3-methylimidazolium bis-((methyl)sulfonyl)amide, 1-butyl-1-methylpyrrolidinium bis((methyl)sulfonyl)imide, 1-butyl-1-methylpyrrolidinium bis(fluorosulfonyl)imide, 1-butyl-1-methyl-pyrrolidinium bis(trifluoro-methane)sulfonimide, 1-butyl-1-methylpyridinium bis(methylsulfonyl)imide, 1-ethyl-1-methyl-pyrrolidinium bis(methylsulfonyl)imide, 1-ethyl-1-methyl-pyrrolidinium bis(fluorosulfonyl)-imide, 1-ethyl-1-methyl-pyrrolidinium bis(trifluoromethane)sulfonimide, 1-ethyl-3-methylimid-azolium bis(methylsulfonyl)imide, 1-ethyl-3-methylimid-azolium bis(fluorosulfonyl)imide, 1-ethyl-3-methyl-imidazolium (EMIM) bis(trifluoromethane)-sulfonimide, 1-methyl-1-propyl-pyrrolidinium bis((methyl)sulfonyl)imide, 1-methyl-1-propylpyrrolidinium bis(fluorosulfonyl)-imide, 1-methyl-1-propylpyrroldinium bis(trifluoromethane)sulfonimide, 1-butyl-2,3-dimethyl-imidazolium bis((methyl)sulfonyl)amide, 1-butyl-2,3-dimethylimidazolium bis(fluorosulfonyl)-imide, 1-butyl-2,3-dimethylimidazolium bis(trifluoromethane)sulfonimide, 1-butyl-1-methyl-pyrrolidinium bis((methyl)sulfonyl)amide, 1-butyl-1-methylpyridinium bis(methyl sulfonyl)-amide, 1-butyl-1-methylpyrrolidinium bis(fluorosulfonyl)imide, 1-butyl-1-methylpyrrolidinium bis(trifluoromethane)sulfonimide, 1-ethyl-1-methylpyrrolidinium bis(methylsulfonyl)amide, 1-ethyl-3-methylimidazolium bis((methyl)sulfonyl)amide, 1-ethyl-1-methylpyrrolidinium bis-(fluorosulfonyl)imide, 1-ethyl-1-methylpyrrolidinium bis-(trifluoromethane)sulfonimide, 1-methyl-1-propylpyrrolidinium bis(methyl sulfonyl)amide, 1-methyl-1-propylpyrrolidinium bis(fluorosulfonyl)imide, 1-methyl-1-propylpyrroldinium bis(trifluoromethane)sulfonimide, 1-butyl-3-methylimidazolium propionate, and 1-butyl-1-methylpyrrolidinium propionate. One specific example of electrolyte ionic liquid 152 is 1-butyl-3-methylimidazolium trifluoromethanesulfonate [$C_9H_{15}F_3N_2O_3S$]. Overall, ionic liquids, which are electrochemically stable in the operating voltage range of zinc and manganese dioxide electrodes may be used. Furthermore, ionic liquids that do not react with moisture and oxygen may be used allowing to perform deposition processes (e.g., printing) in the ambient environment.

In some examples, electrolyte ionic liquid 152 is the same as positive active layer ionic liquid 142. Alternatively, electrolyte ionic liquid 152 is different from positive active layer ionic liquid 142. In some examples, electrolyte ionic liquid 152 is hydroscopic.

Electrolyte salt 153 is an ionic source within electrolyte layer 150. Positive layer salt 143 is another ionic source in the overall system. Electrolyte salt 153 may be uniformly distributed throughout electrolyte layer 150, at least during fabrication of electrolyte layer 150.

In some examples, electrolyte salt 153 comprises multivalent metal ions, such as zinc, aluminum, magnesium, and/or yttrium ions. In some examples, the anion of electrolyte salt 153 is identical or chemically similar to the anion of electrolyte ionic liquid 152. Some example of such anions include, but are not limited to, chlorides, tetrafluoroborate ($BF_4^-$), trifluoroacetate ($CF_3CO_2^-$), trifluoromethansulfonate ($CF_3SO_3^-$), hexafluorophosphate ($PF_6^-$), bis(trifluoromethylsulfonyl)amide ($NTf_2^-$), and bis(fluorosulfonyl)imide ($N(SO_2F)^2$). One specific example of a salt is zinc trifluoromethanesulfonate [$Zn(CF_3SO_3)_2$].

The solubility limit of electrolyte salt 153 within electrolyte ionic liquid 152 is defined as the concentration of electrolyte salt 153 added to electrolyte ionic liquid 152 at which no more electrolyte salt 153 can be dissolved. In some examples, the concentration of electrolyte salt 153 is between 25% and 100% of its solubility limit or, more specifically, between 50% and 95% of its solubility limit, such as between 60% and 88% of its solubility limit. In some examples, the concentration of electrolyte salt 153 in electrolyte layer 150 is 0.1 M to 5 M or, more specifically, between about 0.5M and 2M, between 0.4 and 0.75 M, or even between 0.45 and 0.65 M.

Negative Electrode Examples

Figure 3:
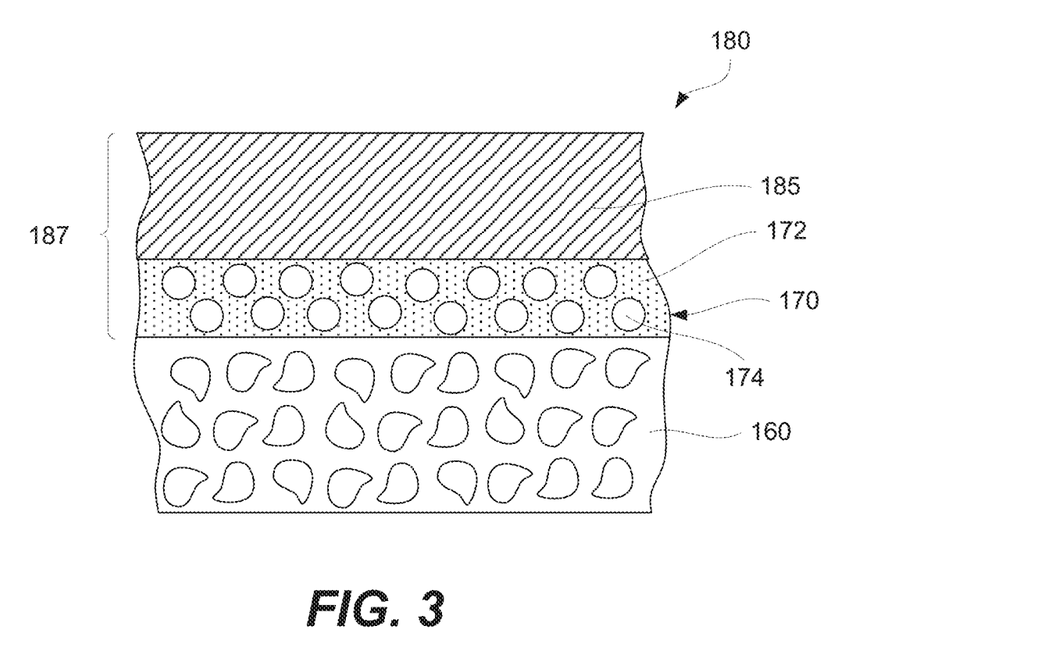
FIG. 3 is an expanded cross-sectional view of the negative electrode in FIG. 2, illustrating additional features of negative and positive electrodes, in accordance with some examples.

Referring to FIGS. 2A and 3, negative electrode 180 comprises negative current collector 185, negative active material layer 160, and conductive pressure sensitive adhesive layer 170. Conductive pressure sensitive adhesive layer 170 is disposed between and directly interfacing negative current collector 185 and negative active material layer 160. Furthermore, conductive pressure sensitive adhesive layer 170 mechanically supports negative current collector 185 and negative active material layer 160 relative to each other and provides electronic conductivity between negative current collector 185 and negative active material layer 160 as further described below. A combination of conductive pressure sensitive adhesive layer 170 and negative current collector 185 may be referred to as negative current collector assembly 187.

Negative current collector 185 provides electronic conductivity between negative active material layer 160 and negative terminal 177, shown in FIG. 4. In some examples, a portion of negative current collector 185, free from negative active material layer 160 and extending outside of the boundary of first packaging layer 110 and second packaging layer 190 is operable as negative terminal 177. In some examples, negative current collector 185 is a metal foil or a metal screen having a thickness of between 1 micrometer and 80 micrometers or, more specifically, between 5 micrometers and 30 micrometers. Thinner structures provide more flexibility, but less structural integrity and electronic conductivity. In some examples, negative current collector 185 is formed from, or at least comprises, one or more of copper (e.g., copper alloy), brass, steel or stainless steel, copper, and zinc. In other examples, negative current collector 185 is a printed layer, comprising a polymer binder and a conductive additive. Some examples of the conductive additive used for a printed example of negative current collector 185 include, but are not limited to, silver, brass, indium, carbon, nickel, and copper. An example of negative current collector 185 may be formed using one or more of ink jet printing, screen printing, stencil printing, flexographic printing, and/or slot die coating.

In some examples, negative active material layer 160 is printed over electrolyte layer 150. Negative active material layer 160 may comprise or consist essentially (e.g., at least 95% by weight or even at least 99% by weight) of elemental metal. The elemental metal may be one providing monovalent ions (e.g., $Li^+$, $Na^+$, $Cu^+$) or polyvalent ions (e.g., $Zn^{2+}$, $Ni^{2+}$, $Al^{3+}Ga^{3+}$, $Co^{3+}$, $Ca^{2+}$, $Mg^{2+}$, so forth). In some examples, negative active material layer 160 is operable to emit multivalent ions when undergoing an oxidation reaction. For example, zinc metal forms zinc ions of divalent charge ($Zn^{2+}$). In some examples, negative active material layer 160 comprises structures having multiple different morphological features (e.g., zinc flakes and spherical particles and nanoparticles) to increase electrode capacity and rate of discharge. Negative active material layer 160 may also comprise a polymer, and in some cases, a polymer and a conductive additive. The conductive additive may be a carbon material (e.g., carbon black, graphite, nanotubes, graphene) or a metal. For example, metals with low overvoltage of hydrogen evolution may be used to minimize side reactions. Some examples include indium, bismuth, brass, lead, and mercury.

Referring to FIG. 3, conductive pressure sensitive adhesive layer 170 provides electro-mechanical connection between negative current collector 185 and negative active material layer 160. A combination of conductive pressure sensitive adhesive layer 170 and negative current collector 185 may be supplied as negative current collector assembly 187. For example, negative current collector 185 may be a metal foil. Conductive pressure sensitive adhesive layer 170 printed over negative current collector 185.

It should be noted that, in some examples, when negative current collector assembly 187 is connected to negative active material layer 160, both conductive pressure sensitive adhesive layer 170 and negative active material layer 160 are already formed. In other words, printing may not be involved in forming an interface between conductive pressure sensitive adhesive layer 170 and negative active material layer 160. Instead, this interface is formed by laminating negative current collector assembly 187 over negative active material layer 160. Characteristics of conductive pressure sensitive adhesive layer 170 are specifically selected to provide electro-mechanical connection between negative current collector 185 and negative active material layer 160 and complete laminating without damaging other components of electrochemical cell 100 already connected to negative active material layer 160. As noted above, in some examples, negative active material layer 160 has been already printed over electrolyte layer 150, which in turn has been printed over positive active material layer 140, which in turn has been printed over positive current collector 125.

In some examples, conductive pressure sensitive adhesive layer 170 comprises polymer base 172 and conductive filler 174. Some examples of polymer base 172 include, but are not limited to, an acrylic polymer, isobutylene (e.g., polyisobutylene (PIB)), and other hydrocarbons, or silicones. These materials allow lamination to negative active material layer 160 at low temperatures, e.g., less than 80° C., thereby preserving the integrity of other previously formed components of electrochemical cell 100, such as negative active material layer 160, electrolyte layer 150, and positive active material layer 140, which may be temperature sensitive. Furthermore, these materials provide good adhesion to negative active material layer 160 and maintain this adhesion during the operating lifetime of electrochemical cell 100. Finally, conductive pressure sensitive adhesive layer 170 is not exposed to any solvents when ionic liquids are used in electrolyte layer 150 and other layers of electrochemical cell 100. This "solvent free" feature allows using the above-referenced examples of polymer base 172, which are otherwise not suitable for conventional electrochemical cells.

Some examples of conductive filler 174 include, but are not limited to, metal particles, carbon-based particles, and the like. Some examples of metal particles include, but are not limited to, nickel particles, copper particles, indium particles, bismuth, brass, and silver particles. The particle size of conductive filler 174 of conductive pressure sensitive adhesive layer 170 may be between 1 micrometer and 100 micrometers or, more specifically, between 1 micrometer and 35 micrometers. It should be noted that the particle size is a secondary-particle size and refers to lengths of particles when high aspect ratio (greater than 3 or 5) particles are used. The size of conductive particles should not exceed the thickness of conductive pressure sensitive adhesive layer 170, unless the conductive particles have a high aspect ratio, as in carbon nanotubes, graphene, silver wires.

The concentration of conductive filler 174 in conductive pressure sensitive adhesive layer 170 is less than about 60% by volume or, more specifically, less than about 30% by volume. At such low concentrations of conductive filler 174, the particles of conductive filler 174 are encapsulated by polymer base 172, further electrochemically isolating conductive filler 174 from the environment and, especially, from electrolyte layer 150.

In some examples, the thickness of conductive pressure sensitive adhesive layer 170 is between about 1 micrometer and 100 micrometers or, more specifically, between about 5 micrometers and 25 micrometers. At such low thicknesses, the conductivity of conductive pressure sensitive adhesive layer 170 may be relatively low while still providing sufficient electronic conductivity between negative current collector 185 and negative active material layer 160. For example, the current density through conductive pressure sensitive adhesive layer 170 may be between 0.01 $mA/cm^2$ and 100 $mA/cm^2$ or, more specifically between 1 $mA/cm^2$ and 10 $mA/cm^2$, during a typical operation of electrochemical cell 100.

Packaging Layer Examples

First packaging layer 110 and second packaging layer 190 support internal components of electrochemical cell 100 and isolate these components from the environment. First packaging layer 110 and/or second packaging layer 190 may be flexible (e.g., able to bend) and conform to the stack formed by positive electrode 120, electrolyte layer 150, and negative electrode 180. First packaging layer 110 and/or second packaging layer 190 may be formed from paper (e.g. cardstock or different types/weaves/thicknesses of paper), polymeric or plastic materials (e.g., polyethylene terephthalate or polyester (PET), polyethylene, polypropylene, Kapton, polyimide, polyester ether ketone (PEEK), polyurethane, polydimethylsiloxane or other silicone resins), fabric of various weaves and meshes (e.g. nylon, cotton, denim) silicon, printed circuit board (e.g. cured epoxy resin substrates, FR4, and flexible circuit boards), glass, metal foil, or a combination thereof (e.g. fabric with plastic backing). In some examples, at least one of first packaging layer 110 or second packaging layer 190 is a microprocessor or a MEMS device. At least one of first packaging layer 110 or second packaging layer 190 may include adhesive backing for attaching to other components.

In some examples, first packaging layer 110 and second packaging layer 190 are made from the same materials. Alternatively, first packaging layer 110 and second packaging layer 190 are made from different materials. As described above, at least one of first packaging layer 110 and second packaging layer 190 may be shared with other external components, such as another battery, an electronic component to which electrochemical cell 100 is connected, and the like. First packaging layer 110 and second packaging layer 190 are sealed relative to each other, thereby isolating internal components of electrochemical cell 100 from the environment.

Processing Examples

Figure 5:
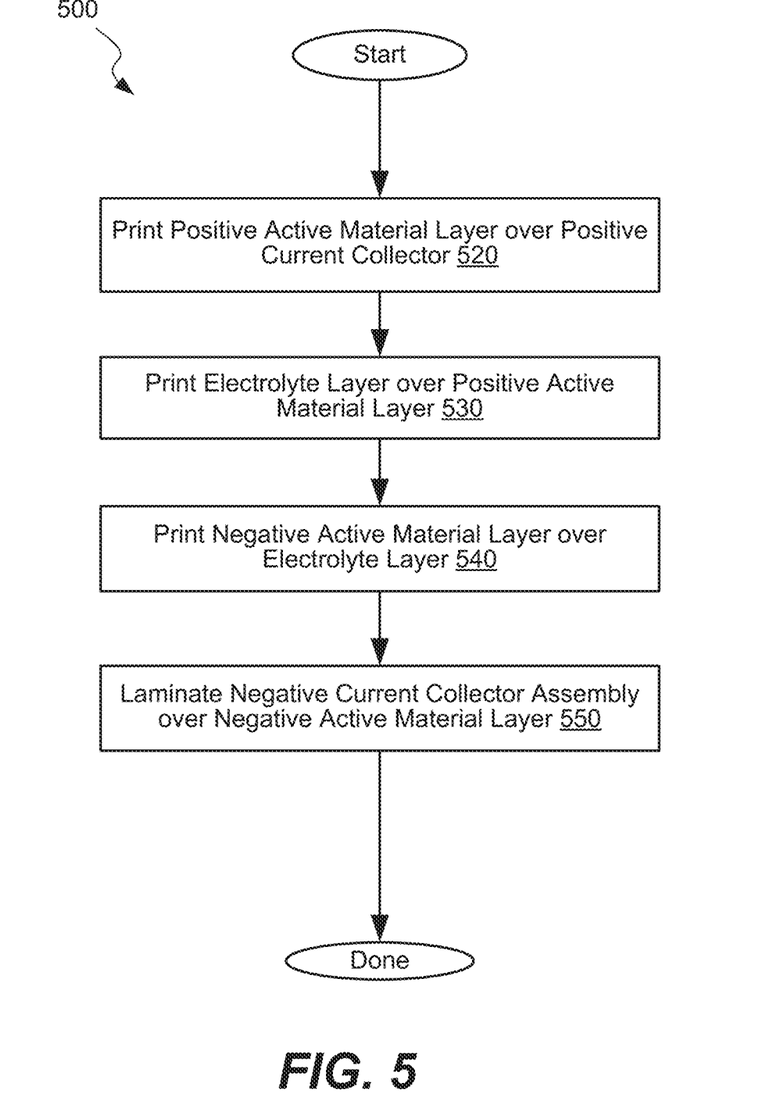
FIG. 5 is a process flowchart corresponding to a method of manufacturing an electrochemical cell in FIG. 1, in accordance with some examples.

FIG. 5 is a processing flowchart corresponding to method 500 of fabricating electrochemical cell 100, in accordance with some examples.

Method 500 involves printing positive active material layer 140 over positive current collector 125 (block 520). In some examples, positive active material layer 140 and/or other layers described below are printed using one or more of the following techniques: direct-write printing, screen printing (e.g. Atma, M&R, Colt), flexographic printing (Dai's Machinery, Line O Matic), gravure printing, dispenser printing, inkjet printing (e.g., FUJIFILM Dimatix), and slot die coating.

Direct write dispenser printing comprises a method for additively depositing a variety of materials, including slurries, solutions, and suspensions, generally referred to as "inks." Direct write dispenser printing is a flow-based method of direct-write patterning with the ability to deposit inks at room temperature and ambient conditions, all the while generating negligible material waste and requiring minimal environmental overhead. In comparison to conventional microfabrication techniques, which utilize subtractive processes such as lithography and etching, the number of process steps, energy demanded, and waste generated is significantly less.

In one arrangement, printable materials for electrodes are slurries of active electrode material particles mixed with a polymer binder(s), a removable solvent, and optional additives. In one example, cathode chemistries may comprise a metal oxide such as vanadium pentoxide particles, manganese dioxide particles, or both kinds of particles as the active cathode material particles. In one example, the anode chemistries have zinc particles as the active anode material particles.

After the ink deposition, the ink is dried. In some examples, the drying is performed at room temperature for about 1-15 minutes and then at a temperature of 60°-90° C. for about 3-30 minutes. A vacuum oven, an infrared lamp, and/or a heat lamp may be used for drying. The drying process removes one or more solvents from the deposited ink thus leaving a solid layer, which is referred to as positive active material layer 140. After all layers are printed, the entire printed stack may be dried to remove any residual evaporative solvents.

Method 500 proceeds with printing of electrolyte layer 150 over positive active material layer 140 (block 530). The printing process is similar to printing of positive active material layer 140 described above. The printing of electrolyte layer 150 may involve a screen or a stencil with a larger print pattern than the footprint of positive active material layer 140. As such, electrolyte layer 150 fully overlaps with positive active material layer 140 and covers positive active material layer 140 in its entirety. In some examples, electrolyte layer 150 is printed in stages, e.g., by printing several sub-layers over each other, e.g., 2 to 5 sublayers. This stage printing aspect may be used to reduce printing defects (e.g., voids) that propagate through the entire thickness of electrolyte layer 150.

Method 500 proceeds with printing negative active material layer 160 over electrolyte layer 150 (block 540). The printing process is similar to printing of positive active material layer 140 described above. The printing of negative active material layer 160 typically involves a screen with smaller print pattern than the footprint of electrolyte layer 150.

Figure 2C:
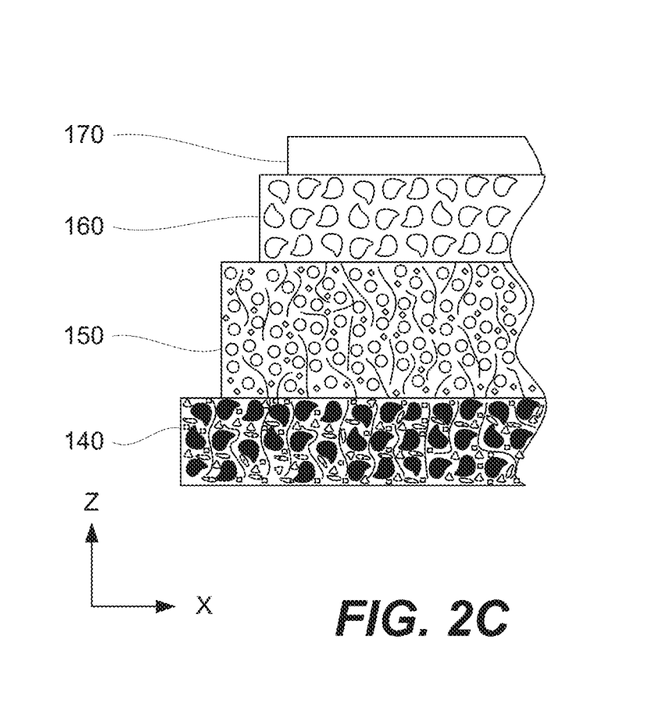

Different printing techniques used for printing positive active material layer 140, electrolyte layer 150, negative active material layer 160 may result in the different alignment of these components. For example, FIG. 2B illustrates edges of positive active material layer 140, electrolyte layer 150, and negative active material layer 160 printed using screen printing. FIG. 2C illustrates edges of positive active material layer 140, electrolyte layer 150, and negative active material layer 160 printed using stencil printing. During stencil printing, the edge alignment may be similar to a pyramid due to the stencil size used for printing electrolyte layer 150 being larger than the stencil for positive active material layer 140.

It is appreciated that not all internal components of electrochemical cell 100 are printed. For example, negative current collector assembly 187 may be provided as a pre-formed solid component. In some examples, a pre-formed zinc foil is used instead of printing negative active material layer 160.

Method 500 proceeds with laminating negative current collector assembly 187 over negative active material layer 160 (block 550). Negative current collector assembly 187 comprises negative current collector 185 and conductive pressure sensitive adhesive layer 170. The laminating operation is performed at a temperature is of less than 80° C. or even less than 60° C. After this lamination operation, conductive pressure sensitive adhesive layer 170 directly interfaces and adheres to each of negative active material layer 160 and negative current collector 185 as, for example, shown in FIG. 2A.

Experimental Data

A series of experiments have been conducted to evaluate the performance of electrochemical cells with and without conductive pressure sensitive adhesive layers. An aluminum positive current collector substrate having a size of 30 mm×37 mm was used to print a carbon-based positive interface layer, followed by printing of the positive active material layer, electrolyte layer, and negative material layer. In reference cells, a copper negative current collector has been stacked directly over the negative active material layer. In test cells, a conductive pressure sensitive adhesive layer has been applied to the copper negative current collector and then laminated over the negative active material layer. Both types of cells were tested for resistance under a load of 45 mA using a discharge pulse for 0.4 sec. The resistance was determined based on the difference between the open-circuit voltage and the voltage at the end of the pulse. Specifically, this voltage difference was divided by the applied current (i.e., 45 mA). The reference cells showed the resistance of about 15 Ohm on average and reading strongly dependent on the pressure applied to the top of the cell, while the test cells showed the resistance of about 7 Ohm on average, which is a major improvement over the reference cells. The presence of the conductive pressure sensitive adhesive provided stable and low resistance contact between the negative electrode layer and the negative current collector. At the same time, the shelf life of the battery using conductive adhesive remained long, in excess of 3 months, because the battery was essentially solvent-free and the conductive adhesive remained intact and did not degrade over a long period of time.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered as illustrative and not restrictive.

What is claimed is:

1. A method of fabricating an electrochemical cell, the method comprising:
   printing a positive active material layer over a positive current collector;
   printing an electrolyte layer over the positive active material layer, wherein the electrolyte layer includes a room temperature ionic liquid and a polymer;
   printing a negative active material layer over the electrolyte layer;
   laminating a negative current collector assembly over the negative active material layer with a pressure sensitive adhesive at a temperature of less than 80° C.; and
   wherein the electrochemical cell produced thereby is solvent-free so as to contain less than 2.0 wt. % of organic solvents.

2. The method of claim 1, wherein:
   the negative current collector assembly comprises a negative current collector and a conductive adhesive layer that includes the pressure sensitive adhesive; and
   after laminating, the conductive adhesive layer directly interfaces and adheres to each of the negative active material layer and the negative current collector.

3. The method of claim 2, wherein the conductive adhesive layer comprises a polymer base and a conductive filler.

4. The method of claim 3, wherein particles of the conductive filler are encapsulated by the polymer base within the conductive adhesive layer.

5. The method of claim 3, wherein the conductive filler in the conductive adhesive layer has a concentration of less than about 50% by volume.

6. The method of claim 3, wherein the polymer base is an acrylic polymer or polyisobutylene (PIB).

7. The method of claim 3, wherein the conductive filler comprises at least one of carbon particles, nickel particles, copper particles, silver particles, indium particles, and bismuth particles.

8. The method of claim 2, wherein the conductive adhesive layer has a thickness of less than 100 micrometers.

9. The method of claim 1, wherein laminating the negative current collector assembly over the negative active material layer forms an electrical connection between the negative current collector and the negative active material layer.

10. The method of claim 1, wherein:
    the electrochemical cell further comprises a first packaging layer and a second packaging layer, enclosing the positive current collector, the positive active material layer, the electrolyte layer, the negative active material layer, and the negative current collector assembly;
    at least one of the first packaging layer and the second packaging layer is flexible and conforms to the positive current collector, the positive active material layer, the electrolyte layer, the negative active material layer, and the negative current collector assembly; and
    the at least one of the first packaging layer and the second packaging layer is polyester.

11. The method of claim 1, wherein the positive current collector comprises one of graphite foil, foil made from carbon nanotubes, metal-plated fibers, metal foams, screens, extended metal structures, grids, and woven metal mesh.

12. The method of claim 1, wherein the positive current collector comprises one of graphite foil.

13. The method of claim 1, wherein the negative active material layer comprises zinc.

14. The method of claim 1, wherein the negative current collector assembly comprises copper.

15. The method of claim 1, wherein each of the positive active material layer, the electrolyte layer, and the negative active material layer comprises an ionic liquid.

16. The method of claim 1, wherein the negative current collector assembly is a printed layer, comprising a polymer binder and a conductive additive, selected from the group consisting of silver, brass, indium, carbon, nickel, and copper.

17. The method of claim 1, wherein printing the negative active material layer over the electrolyte layer is performed using screen printing or stencil printing.

18. The method of claim 1, wherein the negative active material layer has a smaller footprint than the electrolyte layer printed over the negative active material layer.

19. The method of claim 1, wherein the electrochemical cell produced thereby is solvent-free so as to contain less than 0.5 wt. % of organic solvents.

* * * * *